Figure 4:
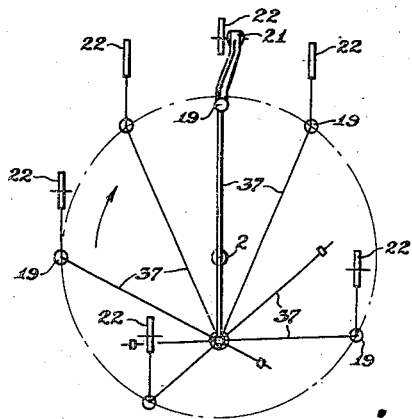

Oct. 19, 1943.  L. N. RUDERT ET AL  2,332,013
FLYING HOT SAW
Filed July 22, 1942.  2 Sheets-Sheet 1
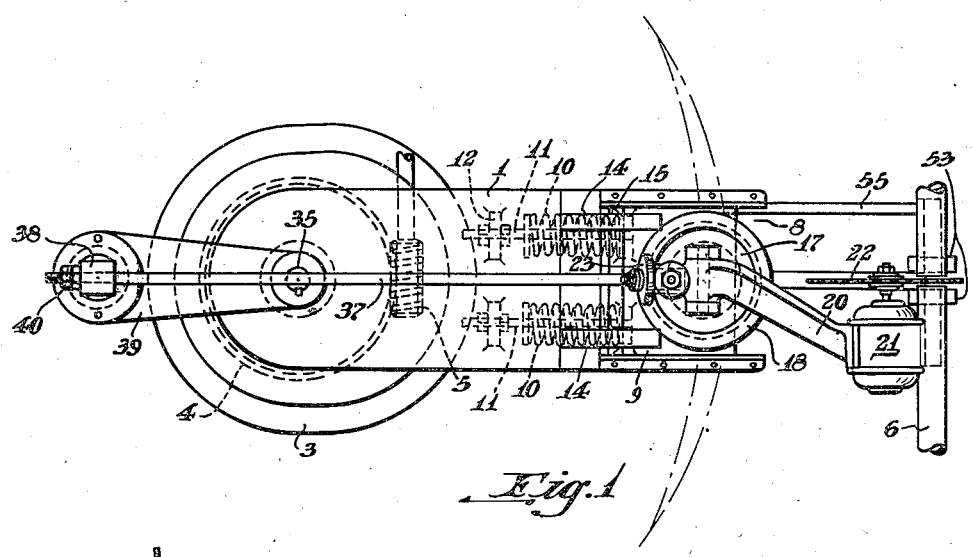
Fig. 1
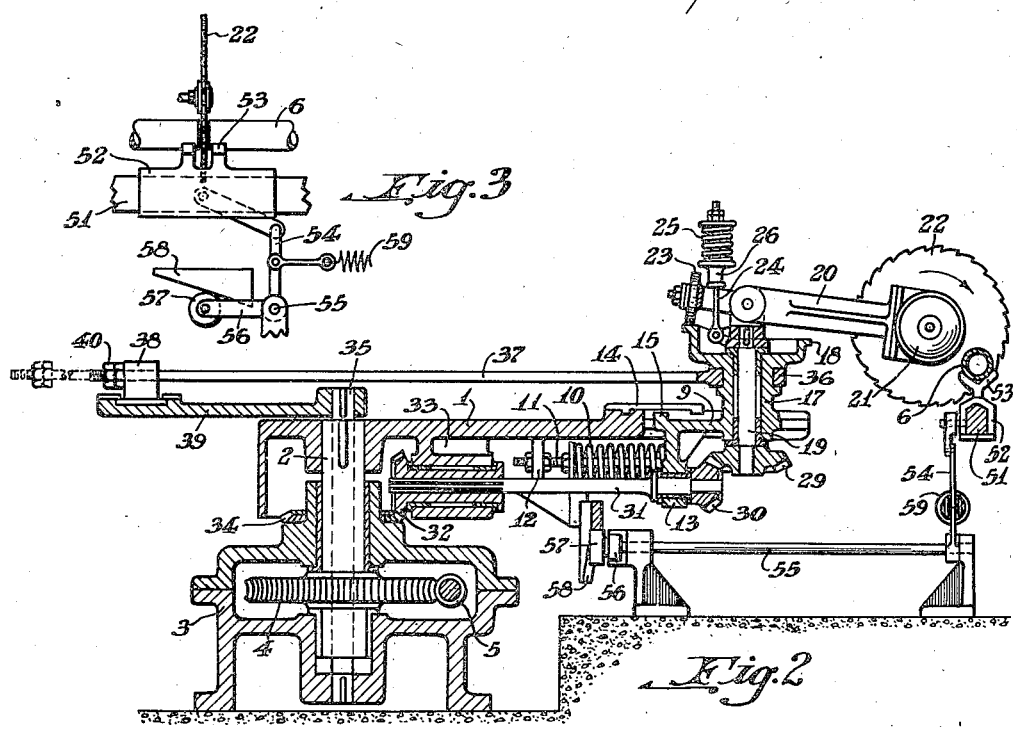
Fig. 3
Fig. 2
INVENTORS.
HOWARD H. TALBOT, and
LYNN N. RUDERT.
BY J. E. Dickinson
their ATTORNEY.

INVENTORS.
HOWARD H. TALBOT, and
LYNN N. RUDERT.
BY Joseph E. Dickinson
their ATTORNEY.

Patented Oct. 19, 1943

2,332,013

UNITED STATES PATENT OFFICE 2,332,013

FLYING HOT SAW

Lynn N. Rudert, Saxonburg, and Howard H. Talbot, Pittsburgh, Pa.; said Talbot assignor to United Engineering & Foundry Company, Pittsburgh, Pa., a corporation of Pennsylvania Application July 22, 1942, Serial No. 451,842

20 Claims. (Cl. 29—69)

This invention relates to flying saws, and more particularly to saws for cutting hot pipes, bars, rods, and the like into sections of predetermined length, the word "pipe" being used herein to cover all of these.

It is customary practice to cut continuously moving pipe into sections, as it leaves the pipe mill, by means of a saw that travels along with the pipe while it is cutting transversely through it. A major difficulty encountered in the use of such saws is in making them travel forward with the pipe at the same speed as the pipe. Unless the two speeds are synchronized the saw blade is distorted while it is sawing and this not only affects the cut but it also quickly destroys the set of the teeth and may even result in breaking of the blade. High upkeep costs and frequent shut-downs to change saw blades are the result.

It is among the objects of this invention to provide a flying saw in which the saw blade remains perpendicular to the pipe and travels at the same speed as the pipe during cutting, in which the saw carriage travels at a uniform speed, which is of simple and compact construction, which is easily adjusted for cutting pipes into sections of different lengths, and which decreases upkeep costs and blade maintenance.

In accordance with this invention, a vertical rotary saw blade is continuously moved in an endless curved path by means of a carriage that rotates at a uniform speed on a vertical axis beside the horizontally moving pipe that is to be cut into sections by the saw. As the blade starts to move in the same general direction as the pipe, means come into operation for flattening its curved path so that it will travel forward with the pipe at a uniform speed. That is, while the blade is sawing the pipe the blade's path of travel is so controlled that the blade travels forward with the pipe the same distance for each degree of rotation of the carriage. The speed of blade travel at this time is made to correspond with the pipe speed by rotating the carriage at the proper speed. The path-controlling means include a blade support spaced laterally from the axis of rotation of the carriage and mounted on the carriage for movement radially thereof, and means for moving the blade support toward and away from the carriage axis while the blade is cutting the pipe. Thus, when the blade support starts to pass between the carriage axis and the pipe, it is moved inwardly of the carriage until it reaches a line passing through that axis and perpendicular to the pipe, and then the blade support moves outwardly again. This flattens the arcuate path of travel of the saw blade during the cutting operation, the degree of flattening being such that the blade moves in the direction of travel of the pipe at a uniform speed. The saw is maintained perpendicular to the pipe during cutting, preferably by means that keeps it in that position at all times. The portion of the pipe being cut may be supported by means traveling with it while the saw is cutting through the pipe.

Figure 5:
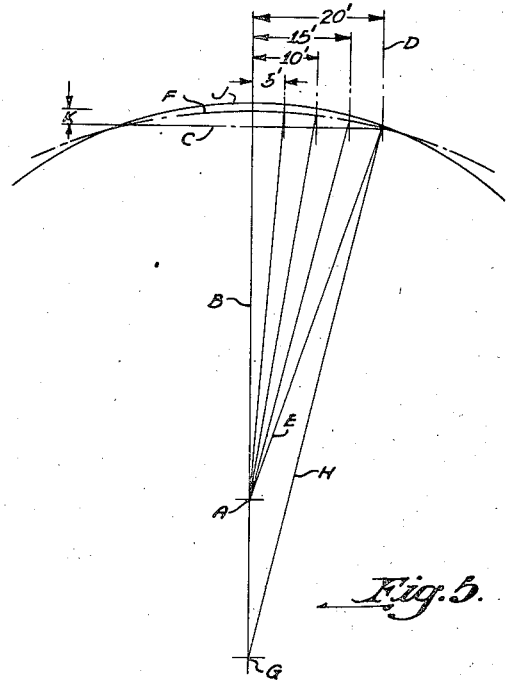
Figure 6:
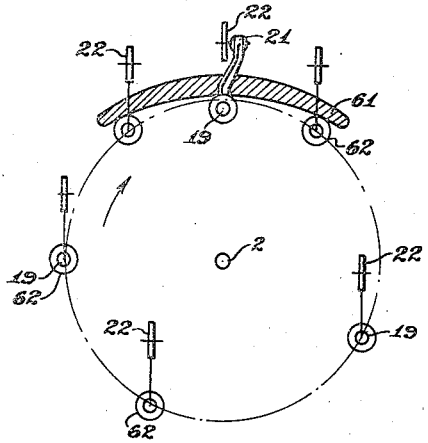
Figure 7:
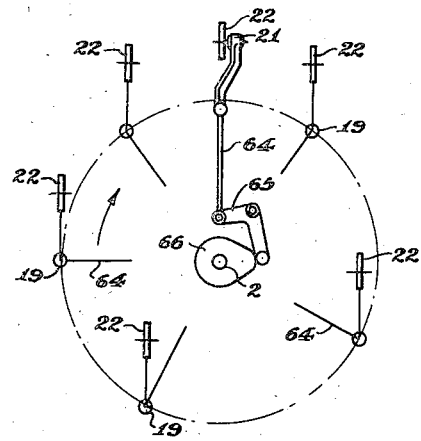

The invention is illustrated in the accompanying drawings in which Fig. 1 is a plan view of the preferred embodiment of our flying saw; Fig. 2 is a vertical section therethrough; Fig. 3 is a fragmentary end view showing the traveling pipe-supporting means; Fig. 4 is a diagrammatic view illustrating the preferred way of controlling the path of travel of the saw blade; Fig. 5 is a diagram showing how the path of the saw blade during cutting is determined; and Figs. 6 and 7 are diagrammatic views similar to Fig. 4 showing two other ways of controlling the path of travel of the saw blade.

Referring to Figs. 1 and 2 of the drawings, an arm-like carriage 1 is rigidly mounted at one end on the upper end of a vertical hollow post 2 that is journaled in a supporting gear box 3. Rigidly mounted on this post in the box is a worm gear 4 that is rotated by a worm 5 driven at the proper speed by a variable speed motor or by variable speed gearing from a mill that produces the pipe 6 that is to be cut. Gear box 3 is spaced laterally from pipe 6 that moves continuously in a horizontal line at a uniform speed.

The outer end of carriage 1 is provided with a rectangular recess 8 in which a slide member 9 is slidably mounted for movement radially of the carriage. The slide is constantly urged outwardly by a pair of coil springs 10 encircling rods 11 that are rigidly mounted at their inner ends in lugs 12 depending from the carriage. The outer ends of these rods are slidably mounted in an integral bracket 13 projecting downwardly from the slide. Outward movement of the slide relative to the carriage is limited by a pair of stops 14 attached to the top of the carriage and having shouldered outer ends adapted to be engaged by a rib 15 on the slide, as shown in Fig. 2. Integrally connected to the slide and projecting upwardly therefrom is a hollow housing 17 the upper end of which is encircled by a vertical flange 18. Rotatably mounted in this housing is a shaft 19 on the upper end of which a laterally projecting arm 20 is pivotally mounted for vertical movement. An electric motor 21, mounted on one end of this arm, carries a vertical saw blade 22. The opposite end of the arm projects a short distance beyond its supporting shaft and is provided with a roller 23 that engages the top of the flange 18. To hold the roller down on the flange and thus counterbalance the saw blade, the short end of the arm is provided with a vertical slot through which an eye bolt 24 extends. The lower end of the bolt is pivotally connected to the upper end of the slide shaft, and a strong coil spring 25 is compressed on the upper end of the bolt for pressing a slidably mounted bearing member 26 down on the arm.

Part of flange 18 is higher than the rest to form a cam surface that periodically raises roller 23 and thereby swings the outer end of arm 20 down so that the saw blade can cut through a pipe. To move the cam surface relative to the roller for this purpose and to hold the blade perpendicular to the pipe at all times, the lower end of slide shaft 19 carries a bevel gear 29 that meshes with a similar gear 30 on the outer end of a horizontal shaft 31 journaled in slide bracket 13, as shown in Fig. 2. The inner end of this shaft is splined in a bevel gear 32 that is journaled in a bracket 33 depending from the carriage. This gear meshes with a horizontal bevel gear 34 that encircles post 2 and is mounted in fixed position on the gear box. The gear ratio is such that as the rotating carriage swings slide 9 around the post, the slide shaft is rotated at such a rate relative to the slide and carriage that the shaft remains in fixed angular relation to the ground. Due to the fact that cam 18 rotates around the slide shaft, there is relative movement between the cam and roller 23 so that the roller is alternately raised and lowered. The high part of the cam is positioned to raise the roller when the saw blade is in a position for engaging the pipe.

Another feature of this invention is that the path of travel of the saw blade while it is cutting the pipe is so controlled that the blade moves forward with the pipe at a uniform speed so that the blade and pipe speeds can be synchronized. This path control may be effected in several ways, the preferred manner being illustrated in Figs. 1 and 2. As there shown a collar 36 is rotatably mounted on slide housing 17, and a rod 37 is integrally connected at one end to the collar. The opposite end of the rod extends through a block 38 that is rotatably mounted on top of the outer end portion of an arm 39 that is rigidly mounted on the upper end of a stationary shaft 35 extending down through the hollow post 2. The longitudinal axis of this arm is perpendicular to the pipe being cut, with the outer end of the arm pointing away from the pipe. The end of the rod projecting through the pivot block is threaded, with lock nuts 40 mounted thereon. To flatten the arcuate path of travel of the saw blade while it is passing through its cutting cycle, i. e., to increase the radius of the arcuate path, the nuts on the tension rod are screwed on far enough to cause it to pull the slide 9 inwardly toward the axis of rotation of the carriage (post 2) when the carriage points toward the pipe with its longitudinal axis perpendicular to the pipe as shown in Fig. 1. As the carriage swings into and out of that position the rod first pulls the slide toward the inner end of recess 8 and then lets springs 10 push it outwardly again until arrested by stops 14.

That is, for the major portion of each cycle of rotation of the carriage the slide is so close to pivot block 38 that rod 37 does not pull on the slide but slides back through the block. The slide therefore remains the maximum distance from the axis of rotation of the carriage, at the outer end of recess 8. However, when the slide starts to approach the pipe, the distance between the slide and the pivot block increases until lock nuts 40 engage the block. As the rod prevents the slide from moving any farther away from the pivot block, continued rotation of the carriage causes the rod to pull the slide toward the inner end of recess 8 until the rod is perpendicular to the pipe and then allows springs 10 to push the slide outwardly again. During the time that the rod is pulling on the slide the path of travel of the saw blade is changed because for a short time the axis of the arcuate path traversed by slide shaft 19 is moved back from the center of post 2 to the center of pivot block 38, thereby lengthening the radius of the arc which has the effect of flattening the arc. The effective length of the rod is such that the blade will travel forward with the pipe at a uniform speed, and the carriage is rotated at such a speed that the blade, during cutting and until it has been retracted, is moved forward with the pipe at the same rate as the pipe.

The way in which the blade path during cutting is determined is shown in Fig. 5 where the point A represents the axis of rotation of carriage 1 and the line B represents the longitudinal axis of the carriage when it is perpendicular to the pipe being cut. The chord C is an imaginary line parallel to the pipe and its length is equal to the distance that the saw blade is in contact with the pipe during every cutting cycle, which lasts until the blade has been retracted from the oncoming severed end of the pipe. The half of the chord C between one end and line B is divided into any desired number of equal lengths by means of parallel lines D perpendicular to the chord and the axis of the pipe. The space between each pair of adjacent parallel lines represents the distance the pipe travels in a certain time. For example, the space between each pair of lines may represent five feet per second when the pipe is traveling 300 feet per minute. There are the same number of lines E radiating from point A as there are parallel lines D, the line E farthest from line B passing through the end of chord C. Lines E are spaced an equal number of degrees apart and represent the number of degrees the carriage rotates during each successive equal unit of time; in the example given above this would be per second. The points at which radiating lines E intersect parallel lines D represent successive positions of the axis of slide shaft 19 during the period that the saw blade engages the pipe. Therefore, an arc F of a circle plotted through these points is the path that the slide shaft should follow in order to move the blade forward with the pipe at a uniform speed, e. g., five feet per second. The axis of this arc is at point G that represents the axis or rotation of pivot block 38, and the radius of the arc is line H which represents tension rod 37. The curved line J between the ends of chord C shows the path that the slide shaft would traverse if the tension rod were not present to pull slide 9 inwardly of the carriage. The extension of curve J beyond the end of the chord is the path that the slide shaft takes after the blade leaves the pipe, because it falls between point A and an extension of arc F so that the tension rod is ineffective and slide 9 is at the outer end of recess 8. The distance K represents the net forward or cross-pipe stroke of the saw blade during the cutting cycle. With pipes of small diameter this movement of the blade may be sufficient to cut through the pipe without any vertical stroke.

It will be seen that this saw can be made adjustable, for cutting pipe sections of different lengths, by moving point A toward or away from the pipe and changing the length of the carriage accordingly, and by also adjusting point G (the axis of pivot block 38) toward and away from point A. The length of rod 37 must therefore be adjustable too, such as by turning the lock nuts thereon.

Due to the fact that a considerable gap must be left in the delivery table for the pipe in the cutting zone, it is desirable to provide traveling means, that will not interfere with the saw blade, for supporting the portion of the pipe being cut so that it will not be distorted. For this purpose a horizontal bar 51 is rigidly mounted below the pipe in the cutting zone, and a supporting member 52 is slidably mounted on the bar. This member has upwardly projecting longitudinally spaced Y-shaped portions 53 that form a small cradle for the pipe. The supporting member is moved along the bar with the saw blade cutting the pipe between its Y-shaped portions. One way of moving the pipe support at the same speed as the blade and pipe is to connect it through a toggle 54 (Fig. 3) to the outer end of a rotatably mounted horizontal rod 55. The inner end of this rod is provided with a crank arm 56 and a roller 57 that is depressed by a cam 58 attached to the bottom of the carriage. When the carriage moves the cam over the roller and depresses it the rod is turned and the toggle moves the pipe support 52 forward with the saw. Any convenient means, such as a spring 59, may be used for retracting the pipe support after the saw has left the pipe.

Fig. 4 illustrates various positions of the saw blade and tension rod during a revolution of the carriage. In accordance with the modification shown in Fig. 6, a fixed cam 61 of the proper curvature may be mounted adjacent the pipe, and the lower end of slide shaft 19 may be provided with a cam roller 62 engaging the cam. The cam thus pushes slide 9 inwardly of the carriage against the compression of springs 10. Another way of moving the slide is illustrated by Fig. 7. This is done by means of a rod 64 connected to a bell crank 65 that is pivoted to the carriage adjacent post 2. The free end of the crank engages a cam 66 mounted in fixed position on the gear box. As the carriage revolves around this cam it swings the bell crank and thereby, through the rod 64, pulls slide 9 inwardly of the carriage.

According to the provisions of the patent statutes, we have explained the construction and operation of our invention and have illustrated and described what we now consider to represent its best embodiment. However, we desire to have it understood that, within the scope of the appended claims, the invention may be practiced otherwise than as specifically illustrated and described.

We claim:

1. A flying saw comprising a vertical rotary saw blade for cutting a horizontally moving pipe, means rotatable at a uniform speed on a vertical axis beside the pipe for carrying said blade in an endless curved path around said axis, and means for flattening said curved path while the blade is cutting the pipe whereby to cause the blade to travel forward with the pipe at a uniform speed.

2. A flying saw comprising a vertical rotary saw blade for cutting a horizontally moving pipe, means rotatable at a uniform speed on a vertical axis beside the pipe for carrying said blade in an endless curved path around said axis, and means for moving the blade first toward and then away from said vertical axis while the blade is cutting the pipe whereby to cause the blade to travel forward with the pipe at a uniform speed.

3. A flying saw comprising a vertical rotary saw blade for cutting a horizontally moving pipe, means rotatable at a uniform speed on a vertical axis beside the pipe for carrying said blade in an endless curved path around the axis, and means for controlling said path while the blade is cutting the pipe whereby to cause the blade to travel forward with the pipe the same distance for each degree of rotation of said rotatable means.

4. A flying saw comprising a laterally extending carriage rotatable at a uniform speed on a vertical axis beside a horizontally moving pipe, a vertical rotary saw blade for cutting the pipe, blade-supporting means spaced laterally from said axis and mounted on said carriage for movement radially thereof and for movement with the carriage around said axis, means for holding the saw blade perpendicular to the pipe during cutting, and means for moving said blade-supporting means first toward and then away from said carriage axis while the blade is cutting the pipe whereby to cause the blade to travel forward with the pipe at a uniform speed.

5. A flying saw comprising a laterally extending carriage rotatable at a uniform speed on a vertical axis beside a horizontally moving pipe, a vertical rotary saw blade for cutting the pipe, blade-supporting means spaced laterally from said axis and blade and mounted on said carriage for movement radially thereof and for movement with the carriage around said axis, means for holding the saw blade perpendicular to the pipe during cutting, and means for moving said blade-supporting means toward said carriage axis as the blade-supporting means starts to pass between said axis and the blade whereby to cause the blade to travel forward with the pipe at a uniform speed while it is cutting the pipe.

6. A flying saw comprising a vertical rotary saw blade for cutting a horizontally moving pipe, means rotatable at a uniform speed on a vertical axis beside the pipe for carrying said blade in an endless curved path around said axis, means for holding the saw blade perpendicular to the pipe at all times, and means for flattening said curved path while the blade is cutting the pipe whereby to cause the blade to travel forward with the pipe at a uniform speed.

7. A flying saw comprising a vertical rotary saw blade for cutting a horizontally moving pipe, means rotatable at a uniform speed on a vertical axis beside the pipe for carrying said blade in an endless curved path around said axis, means for moving the saw blade down through the pipe to cut it, and means for flattening said curved path while the blade is cutting the pipe whereby to cause the blade to travel forward with the pipe at a uniform speed.

8. A flying saw comprising a vertical rotary saw blade for cutting a horizontally moving pipe, means rotatable at a uniform speed on a vertical axis beside the pipe for carrying said blade in an endless curved path around said axis, a cam for moving the saw blade down through the pipe to cut it, and means for flattening said curved path while the blade is cutting the pipe whereby to cause the blade to travel forward with the pipe at a uniform speed.

9. A flying saw comprising a vertical rotary saw blade for cutting a horizontally moving pipe, means rotatable at a uniform speed on a vertical axis besides the pipe for carrying said blade in an endless curved path around said axis, a cam carried by said means and having non-rotatable relation thereto, means holding the saw blade perpendicular to the pipe, means connected to the blade and engaging the cam for moving the blade down through the pipe to cut it, and means for flattening said curved path while the blade is cutting the pipe whereby to cause the blade to travel forward with the pipe at a uniform speed.

10. A flying saw comprising a vertical rotary saw blade for cutting a horizontally moving pipe, means rotatable at a uniform speed on a vertical axis beside the pipe for carrying said blade in an endless curved path around said axis, a cam for moving the saw blade down through the pipe to cut it, means connecting the blade to said rotatable means and rotatable on a vertical axis relative thereto but remaining in fixed angular relation to the ground, and means for flattening said curved path while the blade is cutting the pipe whereby to cause the blade to travel forward with the pipe at a uniform speed.

11. A flying saw comprising a laterally extending carriage rotatable at a uniform speed on a vertical axis beside a horizontally moving pipe, a vertical rotary saw blade for cutting the pipe, blade-supporting means spaced laterally from said axis and mounted on said carriage for movement radially thereof and for movement with the carriage around said axis, means including a stationary gear coaxial with said carriage axis for holding said blade in fixed angular relation to the ground while it is being carried around said axis to thereby maintain the blade perpendicular to the pipe at all times, and means for moving said blade-supporting means toward and away from said carriage axis while the blade is cutting the pipe whereby to cause the blade to travel forward with the pipe at a uniform speed.

12. A flying saw comprising a laterally extending carriage rotatable at a uniform speed on a vertical axis beside a horizontally moving pipe, a vertical rotary saw blade for cutting the pipe, blade-supporting means spaced laterally from said axis and mounted on said carriage for movement radially therefor and for movement with the carriage around said axis, means including a stationary gear coaxial with said carriage axis for holding said blade in fixed angular relation to the ground while it is being carried around said axis to thereby maintain the blade perpendicular to the pipe at all times, a cam carried by said blade-supporting means for moving the blade down through the pipe to cut it, and means for moving said blade-supporting means toward and away from said carriage axis while the blade is cutting the pipe whereby to cause the blade to travel forward with the pipe at a uniform speed.

13. A flying saw comprising a laterally extending carriage rotatable at a uniform speed on a vertical axis beside a horizontally moving pipe, a vertical rotary saw blade for cutting the pipe, blade-supporting means spaced laterally from said axis and mounted on said carriage for movement radially thereof, an arm pivoted on said means and adapted to be swung vertically, means rotatably connecting said blade to the outer end of the arm, means urging the inner end of the arm downwardly, means for periodically raising said inner end to swing the blade down through the pipe to cut it, means for holding the saw blade perpendicular to the pipe during cutting, and means for moving said blade-supporting means toward and away from said carriage axis while the blade is cutting the pipe whereby to cause the blade to travel forward with the pipe at a uniform speed.

14. A flying saw comprising a laterally extending carriage rotatable at a uniform speed on a vertical axis beside a horizontally moving pipe, a vertical rotary saw blade for cutting the pipe, blade-supporting means spaced laterally from said axis and blade and mounted on said carriage for movement radially thereof, means for holding the saw blade perpendicular to the pipe during cutting, means constantly urging said blade-supporting means away from said carriage axis, and means for moving the blade-supporting means toward said axis as the latter means starts to pass between that axis and the blade whereby to cause the blade to travel forward with the pipe at a uniform speed while it is cutting the pipe.

15. A flying saw comprising a vertical rotary saw blade for cutting a horizontally moving pipe, means rotatable at a uniform speed on a vertical axis beside the pipe for carrying said blade in an arcuate path around said axis, and means for moving the blade in an arcuate path having its axis behind said vertical axis while the blade is cutting the pipe whereby to cause the blade to travel forward with the pipe at a uniform speed.

16. A flying saw comprising a laterally extending carriage rotatable at a uniform speed on a vertical axis beside a horizontally moving pipe, a vertical rotary saw blade for cutting the pipe, blade-supporting means spaced laterally from said axis and blade and mounted on said carriage for movement radially thereof, means for holding the saw blade perpendicular to the pipe during cutting, resilient means constantly urging said blade-supporting means away from said carriage axis, and means for pulling the blade-supporting means toward said axis as the latter means starts to pass between that axis and the blade whereby to cause the blade to travel forward with the pipe at a uniform speed while it is cutting the pipe.

17. A flying saw comprising a laterally extending carriage rotatable at a uniform speed on a vertical axis beside a horizontally moving pipe, a vertical rotary saw blade for cutting the pipe, blade-supporting means spaced laterally from said axis and mounted on said carriage for movement radially thereof, means for holding the saw blade perpendicular to the pipe during cutting, and tension means pivoted at one end in fixed position at a point spaced from said carriage axis on the side opposite to the pipe, the opposite end of said tension means being connected to said blade-supporting means for pulling the latter in toward said vertical axis as the blade-supporting means starts to pass between said axis and the pipe whereby to cause the blade to travel forward with the pipe at a uniform speed while it is cutting the pipe.

18. A flying saw comprising a laterally extending carriage rotatable at a uniform speed on a vertical axis beside a horizontally moving pipe, a vertical rotary saw blade for cutting the pipe, blade-supporting means spaced laterally from said axis and mounted on said carriage for movement radially thereof, means for holding the saw blade perpendicular to the pipe during cutting, and a rod pivoted at one end in fixed position at a point spaced from said carriage axis on the side opposite to the pipe, the opposite end of the rod being pivotally connected to said blade-supporting means for pulling the latter in toward said vertical axis as the blade-supporting means starts to pass between said axis and the pipe whereby to cause the blade to travel forward with the pipe at a uniform speed while it is cutting the pipe.

19. A flying saw comprising a vertical rotary saw blade for cutting a horizontally moving pipe, means rotatable at a uniform speed on a vertical axis beside the pipe for carrying said blade in an endless curved path around said axis, means for flattening said curved path while the blade is cutting the pipe whereby to cause the blade to travel forward with the pipe at a uniform speed, and means traveling with the pipe during cutting for supporting the portion of the pipe being cut by the blade.

20. A flying saw comprising a vertical rotary saw blade for cutting a horizontally moving pipe, means rotatable at a uniform speed on a vertical axis beside the pipe for carrying said blade in an endless curved path around said axis, means for flattening said curved path while the blade is cutting the pipe whereby to cause the blade to travel forward with the pipe at a uniform speed, means for supporting the portion of the pipe being cut, and means actuated by the movement of said rotatable means for moving said supporting means along with the pipe and blade at a uniform speed.

LYNN N. RUDERT.
HOWARD H. TALBOT.